US006394418B1

(12) United States Patent
Duan et al.

(10) Patent No.: US 6,394,418 B1
(45) Date of Patent: May 28, 2002

(54) BELLOWS ACTUATOR FOR PRESSURE AND FLOW CONTROL

(75) Inventors: Shizhong Duan, Coquitlam; Douglas W. P. Smith, Port Coquitlam, both of (CA)

(73) Assignee: ABB, Inc., North Vancouver (CA)

(*) Notice: Subject to any disclaimer, the term of this patent is extended or adjusted under 35 U.S.C. 154(b) by 0 days.

(21) Appl. No.: 09/712,417

(22) Filed: Nov. 14, 2000

(51) Int. Cl.[7] .............................................. F16K 31/126

(52) U.S. Cl. .................. 251/335.3; 251/61.2; 251/61.4; 251/282

(58) Field of Search ................................ 251/61.2, 282, 251/335.3, 61.1, 61, 61.4

(56) References Cited

U.S. PATENT DOCUMENTS 2,715,009 A * 8/1955 Beekley ................. 251/61.4 X
2,786,487 A * 3/1957 Spence .................. 251/61.4 X
2,919,102 A * 12/1959 Peters .................... 251/282 X

* cited by examiner

*Primary Examiner*—Kevin Lee
(74) *Attorney, Agent, or Firm*—Michael M. Rickin

(57) ABSTRACT

An actuator for controlling the pressure of fluid, such as water or steam, from a fluid source to a flow controlling orifice. The actuator can be used to apply such fluids to the web of a papermaking machine. The actuator comprises a housing having a first inlet connectable to the fluid source and a second inlet connectable to a pressure source. A resilient bellows structure extends between the first and second inlets within the housing to define an internal region of the bellows structure in sealed communication with one of the first and second inlets and an external region of the bellows structure in sealed communication with the other inlet. The bellows structure expands or contracts within the housing depending on the difference in pressures between the internal and external regions of the bellows. A valve member adapted to move with the bellows structure is provided to open and close the first inlet to vary the flow of fluid from the fluid source and maintain a pressure related to a balance of forces of the bellows structures. An outlet from the housing in communication with the first inlet permits the exit of the flow of fluid to a flow controlling orifice. A pneumatic control signal provided to the second inlet controls expansion or contraction of the bellows structure to control the pressure and flow of water or steam from the outlet. In a variation, the actuator is equipped with an additional inlet that is connectable to a source of atomizing air for the fluid flow. The actuator is a compact and rugged unit with a minimum of moving parts to ensure reliable and efficient operation in the harsh working environment of a papermaking machine.

38 Claims, 7 Drawing Sheets

BELLOWS ACTUATOR FOR PRESSURE AND FLOW CONTROL

FIELD OF THE INVENTION

This invention relates to an actuator for controlling the amount of fluid delivered through a valve arrangement, and more particularly, to an actuator for independently controlling the application of fluid (e.g. water, steam) in discrete zones across a papermaking machine.

BACKGROUND OF THE INVENTION

Paper Production

In the modern production of paper, a continuous fiber/water slurry is formed as a moving web. As the slurry moves down the paper machine the water is removed to leave the fiber which forms the paper sheet. The first section of the paper machine drains the water under the influence of gravity (on the fourdrinier table) and produces a web with sufficient strength to be self-supporting to feed it into a press section. The second section of the paper machine presses the paper web and squeezes the water from the sheet. This section typically consists of a series of rolls forming press nips between them through which the paper web is fed. After pressing removes all the water that it can, the remaining moisture in the web must be evaporated. The third section of the paper machine evaporates the remaining moisture in the paper web down to the final level desired for the grade of paper being produced.

During the production of paper it is important that a consistent quality be produced and maintained. Of the many paper parameters, the moisture content is probably the most basic. It is not only important that the overall moisture level be controlled, but also that the moisture distribution throughout the sheet be controlled both in the moving (machine) direction (MD) and in the width (cross-machine) direction (CD). Variation in moisture content of the sheet will often affect paper quality as much or more than the absolute moisture content. There are numerous influences on the paper machine that can cause variation of the moisture content; in particular in the cross machine direction. Wet edges and characteristic moisture profiles are common occurrences on paper machines. Thus a number of actuator systems have been developed to offer control of the moisture profile during paper production.

Conventional actuator systems for controlling the moisture profile across the sheet in paper machines work by selectively delivering steam or spraying water onto the paper web during production. If steam is used, it is added before the press nips with the effect of increasing the temperature of all of the moisture in the web. The added temperature makes the water removal by pressing much more effective; the added moisture removal being much greater than the added moisture of steam condensation. If water is sprayed onto the web, it is done in the evaporating section. The added water to the surface can be used to even out the moisture variance across the web. It can have the added effect of locally cooling the web to prevent damaging overheating. Water sprays are generally used for quality improvements while steam showers are used for both production and quality improvements.

Steam Shower Systems

Profiling steam showers deliver a variable distribution of steam in zones across the paper web. Each zone needs an independent actuator to control the volume of flow in that area. Traditionally the actuator used for such a zone control has controlled the steam flow rate by positioning a steam valve in response to a pneumatic signal. The pneumatic signal is varied, typically from 6 psig to 30 psig, to set an amount of valve opening. The pneumatic control portion of the actuator is separated from the steam valve portion.

In this invention a pneumatic signal is varied to directly control the steam pressure at discrete zones across the paper web. An orifice determines the steam flow from its controlled pressure chamber to the paper web area. This approach allows for a smaller actuator and a full shutoff design.

Moisture Spray Systems

Moisture spray actuator systems used in paper machines are designed to apply a profile of moisture spray in the cross-machine direction to counter an undesirable moisture profile in the paper web. Thus these systems consist of a series of actuator modules capable of independently adjusting the amount of spray in discrete adjacent zones in the cross-machine direction. Control of the flow at each zone is made from a logic decision off the machine via a signal sent to that zone position. How this signal is handled becomes an important consideration for such actuator systems.

The moisture spray systems used in paper machines are designed around spray nozzle characteristics. The nozzle is the device that breaks the water particles into a fine droplet size. These nozzles typically use either the hydraulic pressure of the water or use a separate air pressure line to produce the droplets. Other techniques may include such technologies as ultrasonics to produce droplets.

Hydraulic designs use the water pressure directly to break up the water droplets into a spray mist. Typically this technique is limited in how small a particle size it can produce. A change in flow rate affects the mist characteristics (particle size, spray pattern, etc.) of hydraulic nozzles reducing its turndown capability making these nozzles most effective at a single flow rate. These designs need accurately machined tiny openings that become subject to impurities in the feed water. Any partial plugging or blocking of a nozzle opening affects the volume flow as well as the spray pattern and causes the nozzle to lose its mist effect.

Pneumatic designs use compressed air to break up the water droplets into a spray mist. The mist is carried by the compressed air flow to the web surface. The nozzle openings for the water are not as critical to the spray pattern giving them a greater turndown capability. However it is typical that the average particle size will vary (increase) as the water flow is increased. Any partial plugging of the water nozzle opening affects the volume flow but often not the spray pattern. Both the water and air must be provided without impurities to maintain proper operation.

It is of particular interest to make a system that interfaces readily to a programmable logic controller (PLC) or computer. The conventional method of control for each zone has been to use multiple solenoid-operated valves. Each valve can be optimized for spray particle size at a particular water flow rate. Also, solenoid valves give reasonable assurance of 100% shutoff. These multiple valve groupings open the volume flow in a binary manner such that the first solenoid valve allows the minimum flow, the second solenoid valve allows twice the minimum flow, the third solenoid valve allows four times the minimum flow and so on. Thus 4 solenoids are used in combinations to give 16 discrete flow settings while 5 solenoids give 32 discrete flow settings. Nozzles are sized to optimize the spray pattern and particle size for the particular flow.

Locating the zone control solenoid actuators local to the spray nozzles (out over the paper machine) gives the most compact overall design. A common water header (and a common air header when pneumatic designs are used)

supplies all zones. Typically a block encompassing the multiple solenoid-operated valves is mounted in each zone. Wiring is fed out to the individual on-machine solenoids. This approach has the disadvantage of placing the electrical solenoids in a very harsh environment. Failures of solenoids are frequent in the very hot and humid environment and replacement of solenoids can require an expensive paper machine shutdown.

Zone control solenoid actuators have, in some systems, been located off the machine with the water piped to the individual zones for spraying. These systems put the electrical solenoids in a controlled environment and give them accessibility. Pressure drops of water (and air) from the control cabinet to the machine zones must be addressed. The space required on the machine is about the same due to the tradeoff of solenoids for individual piping. However, the space required off the machine is greatly increased to accommodate the extra piping, etc.

From the above discussion, it is clear that existing water spray systems have a number of limitations. The first difficulty is the amount of space required for the portion of the system located on the paper machine. It is typical to find that there is little available space between rolls, carrier felts, paper web, etc. A smaller space requirement for the moisture spray system would mean many more opportunities to optimize the location of equipment on the paper machine. Multiple nozzles per zone require greater space to fit the nozzles, associated piping and solenoids. This introduces more weight needing support, which in turn, requires a greater support structure and again more weight.

The binary control strategy of multiple solenoid valves per zone limits the resolution of the flow control. Although the resolution is generally considered "good enough", the ability to optimize control is limited. In addition multiple solenoids bring multiple potential points of failure along with their additional cost. Clearly fewer components would give fewer opportunities for failure.

It is also recognized that the solenoid operator is a low lifetime component in this application. The paper machine is operated continuously 24 hours a day with only one or two planned shutdowns a year. Since it is extremely expensive to lose production, installed equipment is desired to have a 10 to 20 year lifetime with little or no servicing. Actuator reliability is critical.

Regulation of spray water for continuous settings has limitations when desired in a harsh environment. Generally the spray nozzles, as used in the papermaking application described above, require a very low flow rate. Remote regulation of the spray water supply would require flow control rather than pressure control to overcome the difficulty of low flow, long transport lines and various pressure drops. In addition, since the water is flowing, a continuous regulation would be required which can be costly. Regulation of the spray water pressure local to the spray nozzle would give accurate flow rate characteristics. However, in a harsh environment, a controller needs to be reliable and use a reference medium that is inherently rugged. Interestingly, the reference medium does not need to flow continuously but simply hold a reference setting. This realization gives some flexibility to the potential control strategies that can be employed. The present invention applies this concept to create an infinitely variable actuator.

SUMMARY OF THE INVENTION

To address the shortcomings of the prior art, we have developed a novel actuator for controlling the delivery of moisture to a surface. The actuator can be used in conjunction with a spray nozzle in a water spray system for a paper machine. The actuator also finds application in a steam control flow valve for use in a steam shower on a paper machine. This invention uses a single nozzle actuator assembly at each zone with full shutoff capability. More importantly, the actuator of the present invention incorporates a novel concept for a fully proportional actuator. Resolution of this new actuator is limited only by the control signal to the actuator and not by the actuator itself. The small size and weight of the actuator allows for a minimum space requirement.

Accordingly, the present invention provides an actuator for controlling the flow of fluid from a fluid source comprising:

a housing having a first inlet connectable to the fluid source and a second inlet connectable to a pressure source;

a piston movable within the housing;

a flexible seal extending between the piston and the housing to define a first region in sealed communication with the first inlet and a second region in sealed communication with the second inlet, the piston moving within the housing in response to the difference in pressures between first and second regions;

a valve member adapted to move with the piston to open and close the first inlet to vary the pressure in the first region; and at least one orifice in sealed communication with the first region to permit the exit of the flow of fluid and provide resistance to the fluid flow so that the pressure in the first region builds to match proportionally the pressure at the second inlet, the pressure from the pressure source at the second inlet providing a signal to control the pressure in the first region feeding the at least one orifice to determine the flow passing the at least one orifice without regard to the exact position of the valve member.

Preferably, the flexible seal comprises a metal bellows structure.

In the first embodiment, the actuator of the present invention is used to control a standard off-the-shelf hydraulic water spray nozzle. Alternately, the actuator of the first embodiment can be used to control the steam pressure feeding an orifice to control the steam flow to a steam shower zone. The bellows structure of the actuator operates as a regulator to control the pressure of the fluid fed to the nozzle (or orifice) and, in this way, controls the water (or steam) flow to the zone. The reference pressure for the bellows structure is a pneumatic pressure signal generated off machine.

The actuator of the present invention is preferably used in a system which includes a common header extending across the paper machine to carry the fluid being delivered to the paper web, e.g. spray water or steam. Preferably, this header has regular attachment points where the actuator of the present invention and the outlet for each zone attaches. The outlet can be a water spray nozzle or a steam orifice. The header is fabricated and machined identically at each zone to accurately locate the spray nozzle or steam orifice, feed the spray water or steam to the actuator location and to fit the actuator in place. A separate small diameter tube is brought out to each actuator to deliver the pneumatic control signal.

The actuator regulates the pressure of the fluid (spray water or steam) using the pneumatic control signal for reference. The design is made to allow for a non-zero kickoff pressure. As such, the control air can operate with a different minimum pressure than the spray water or steam allowing a typical 6–30 psig range of pneumatic air to produce a 0–24 psig range of spray water or steam. A different range of pneumatic air control pressures may be used to match a particular operating range of steam or water pressures.

The bellows structure of the actuator separates the pneumatic control air and the fluid being delivered to the web and is positively sealed (welded or soldered) to prevent leakage. The stroke of the bellows structure is extremely small as it serves only to balance pressures. This means that the inherent spring rate of the bellows or a separate spring can be used for pre-loading the actuator (giving a non-zero "kickoff") but will have a negligible effect on the operation. The result is a highly linear actuator response feeding the outlet of the actuator.

In a further embodiment, the present invention provides an actuator that is used for controlling the larger steam flows to a steam shower. This embodiment of the actuator uses a significantly larger inlet opening which is required to allow for these larger steam flow rates. A larger inlet opening will exert a greater back pressure on the bellows structure and negatively affect its accuracy and linearity. In the second embodiment, a double inlet opening is used and arranged such that only the difference in area of the two inlet openings affects the back pressure on the bellows structure. Thus, a significantly larger inlet opening and flow rate can be accommodated without losing accuracy and linearity.

In a still further aspect, the present invention provides an actuator for controlling the flow of fluid from a fluid source comprising:

- a housing having a first inlet connectable to the fluid source, a second inlet connectable to a first pressure source, and a third inlet connectable to a second pressure source;
- a piston movable within the housing;
- a first flexible seal extending between the housing and the piston to define a first region in sealed communication with the first inlet;
- a second flexible seal extending between the housing and the piston to define a second region in sealed communication with the second inlet;
- a third flexible seal extending between the housing and the piston to define a third region in sealed communication with the third inlet;
- the piston moving within the housing in response to pressure differences within the first, second and third regions to a position such that the forces exerted by the first region on the piston are balanced by the forces exerted by the second and third regions;
- a valve member adapted to move with the piston to open and close the first inlet to vary the flow of fluid from the fluid source; and
- an outlet from the housing in communication with the first inlet to permit the exit of the flow of fluid whereby varying the pressure from the pressure source at the second inlet provides a signal to move the position of the piston to control the pressure of fluid from the outlet.

Once again, the flexible seals preferably comprise metal bellows structures.

According to this further aspect, the present invention provides an actuator that is used to control two separate flows, one of water and the other of air, in a predictable ratio using a single pneumatic control signal. In this embodiment, the pneumatic control signal is again typically a 6–30 psig range although other signal ranges can be used. However, at different water flow rates, the pressure and flow rate of atomizing air adjusts to maintain a substantially constant spray particle size of the water droplets. By using multiple bellows of relative size and specific arrangement, a single control signal can be used to effect the combination of final water flow rate and air/water ratio to maintain the optimum water droplet size.

The present invention also provides an actuator for use with steam in relatively low flow rate applications. The valve opens only enough to pass sufficient volume flow to maintain the balance pressure with the pneumatic control signal. It is recognized that if the supply pressure of steam is sufficient, the flow through the valve reaches sonic speeds. Such high velocities can cause surface wear. To mitigate this effect the fourth embodiment includes one or more reduced area passages in the inlet flow path which cause pressure drops prior to the inlet valve itself. In this manner the pressure drop across the inlet valve is reduced which causes the valve to open more and reduces the flow velocity through the valve.

BRIEF DESCRIPTION OF THE DRAWINGS

Aspects of the present invention are illustrated, merely by way of example, in the accompanying drawings, in which.

DESCRIPTION OF THE PREFERRED EMBODIMENTS

Figure 1:
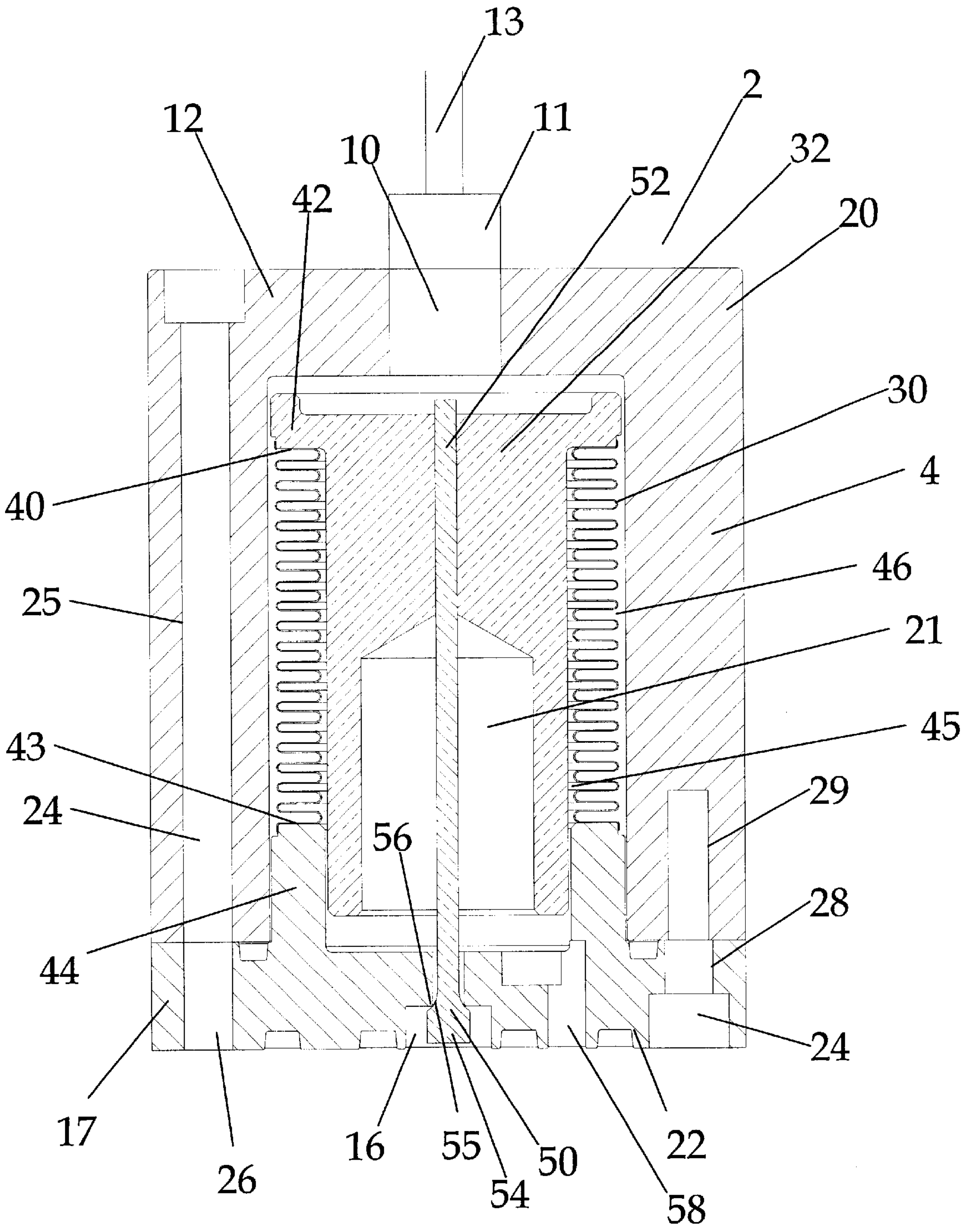
FIG. 1 is a section view through a first embodiment of the actuator of the present invention useful to control water flow to a spray nozzle.
Figure 1A:
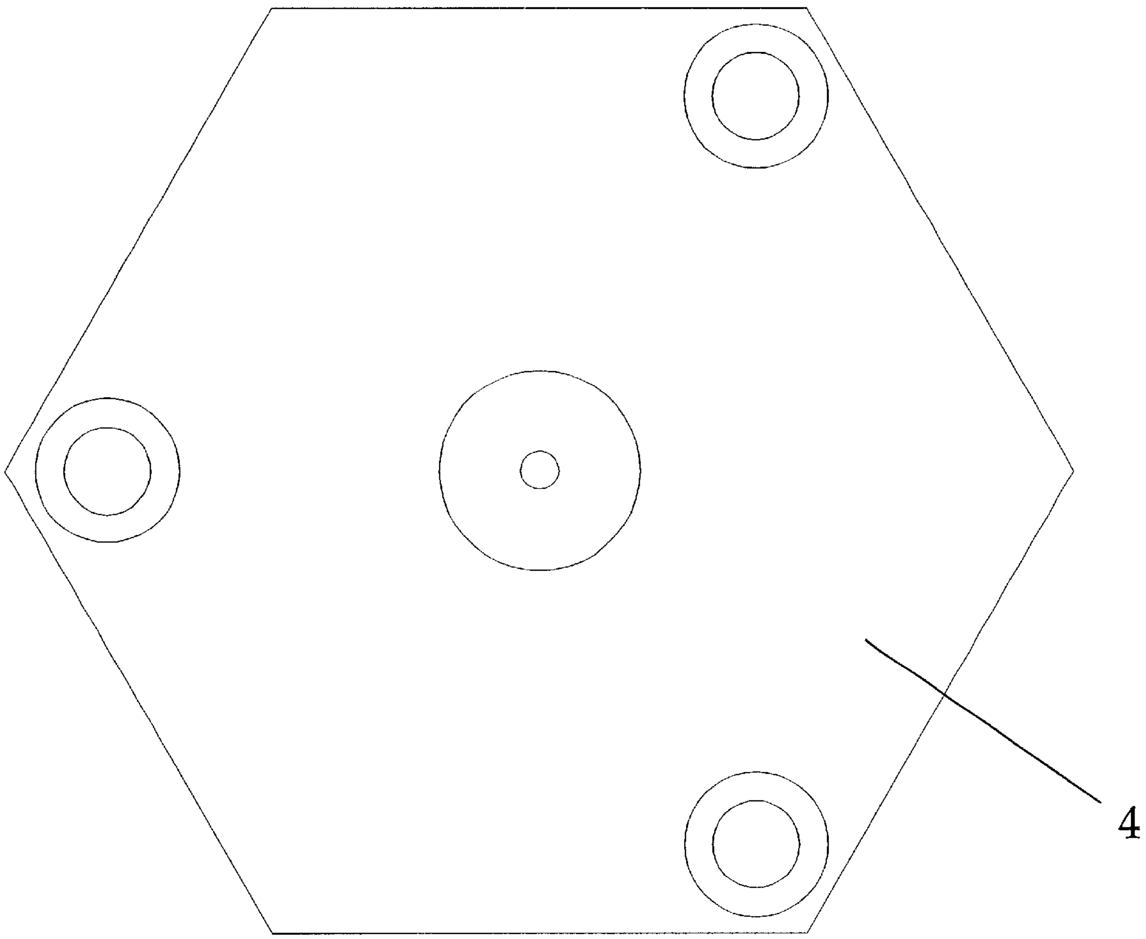
FIG. 1*a* is a top view of the actuator of FIG. 1.

Referring to FIGS. 1 and 1*a*, there is a section view through a first embodiment of an actuator 2 according to the present invention for controlling the flow of water to the web of a papermaking machine. Actuator 2 comprises a housing 4 having a first inlet 16 at one end 17 of the housing connectable to the water source (not shown) in a conventional manner. There is a second inlet 10 at the opposite end 12 of the housing connectable to a source of pressure (not shown) via a standard connection 11 and pressure line 13. Preferably, the source of pressure is a pneumatic source that can be varied in a controlled manner. Preferably, the water source communicates with inlet 16 via a manifold extending across the paper machine. A series of identical actuators, each actuator having an associated spray nozzle, are mounted to the manifold at spaced intervals to define control zones in the cross machine direction for spraying water to control the moisture profile of the paper web.

In the illustrated first embodiment of FIGS. 1 and 1*a*, housing 4 is shown as a generally hexagonal body having a hollow cylindrical interior 21 that contains the moving parts of the actuator. Preferably, the housing is formed from an upper cap 20 that is mounted to a lower base 22. A series of threaded fasteners 24 extend through passages 28 in the base to engage aligned threaded openings 29 in the base to secure the base and cap together. A series of passages 24 extend through the cap and align with openings 26 in the cap to allow securing the actuator to an external mount.

Internally, there is a resilient bellows structure 30 within the cylindrical interior 21 of housing 4 extending generally between the first inlet 16 and the second inlet 10. Bellows structure 30 is preferably formed from metal and has an intrinsic resiliency that allows the bellows structure to freely expand and contract along its longitudinal axis.

There is also a movable piston 32 within the interior 21 of housing 4. The piston 32 is movable with the expansion and contraction of the bellows structure. Housing 4 and piston 32 co-operate to define an annular region therebetween to receive the bellows structure 30. This arrangement acts to prevent buckling or squirm of the bellows structure within the housing.

The bellows structure has a first end 40 that is sealably attached to a flange 42 that extends from piston 32. The second end 43 of the bellows structure is sealably attached to the base 22 of the housing. Preferably, base 22 includes a raised annular lip 44 that slidably receives the lower end of piston 32 to guide the movement of the piston. The top edge of raised annular lip 44 also serves as the surface to which the lower edge 43 of the bellows structure is sealed.

The sealing of the ends of the bellows structure divides the interior 21 of the actuator into an internal region 45 between the piston and the bellows structure and an external region 46 between the bellows structure and the wall of the housing. Internal region 45 is in sealed communication with first inlet 16 for water. External region 46 of the bellows structure between the bellows structure and the housing is in sealed communication with the second inlet 10 connected to the pneumatic pressure source.

Bellows structure 30 will expand or contract within the housing depending on the difference in pressures between the internal and external regions 45 and 46, respectively. For example, when pneumatic pressure is applied through inlet 11, the pressure in external region 46 will be greater than the pressure in internal region 45 with the result that the bellows structure 30 will contract longitudinally within housing 4. Conversely, the bellows structure will expand when the pressure in internal region 45 is greater than the pressure in external region 46.

Piston 32 includes a valve member 50 adapted to move with the bellows structure to open and close the first inlet 16 to vary the flow of water from the water source. Valve member 50 comprises an elongate stem 52 rigidly mounted to piston 32. The stem terminates in an enlarged plug 54 having a sealing surface 55 adapted to seat against the shoulder 56 of inlet 16 to close the inlet. Valve member 50 protrudes from piston 32 a distance such that when the valve member is positioned to close the first inlet, the bellows structure is compressed between the piston flange and the housing. Thus, there is a residual spring force load of the bellows structure holding the valve member in position to close inlet 16. This also establishes a "kick-off" pressure that must be reached by the pneumatic control signal at air inlet 10 before inlet 16 will open. This also establishes that the value of the water pressure in region 45 is maintained at a pressure less than the pneumatic pressure by the value of the "kick-off" pressure.

Base 22 is formed with an outlet 58 from the housing in communication with internal region 45 to permit the exit of the water from the actuator. Outlet 58 is typically connected to a conventional externally mixed air atomizing spray nozzle to deliver water to the web of the papermaking machine. The atomizing air is typically supplied to all such spray nozzles from a common manifold. This style of spray nozzle minimizes the required spray water pressure as the energy to atomize the water is supplied by the air pressure drop.

In operation, the actuator of the present invention according to the first embodiment of FIGS. 1 and 1*a* works to control the volume of water fed to the spray nozzle using the pneumatic/pressure from the pressure source at the second inlet 10 as a reference.

Source water is fed to the water inlet 16 at a pressure in excess of the maximum desired pressure for the spray nozzle. Control air is delivered to the actuator air inlet 10. The air pressure in external region 46 acts against the exposed area of bellows structure 30 to create an operating force which is resisted by three opposing forces. One opposing force is the result of the resiliency of the compressed bellows structure 30. The second opposing force is a result of the pressure of the source water acting against the relatively small area (the cross section area of the opening at 56) of the exposed valve plug 54 at water inlet 16. The third opposing force is created by the spray water pressure (the back pressure of the spray nozzle) in internal chamber 45 acting against the exposed internal area of the bellows structure. The first two reactive forces are constant or substantially constant which allows changes to the control air pressure at air inlet 10 to predictably affect the pressure of the water feeding the spray nozzle. The actuator operates on a balance of these forces. The pressure of the water in internal region 45 is maintained by the actuator 2 to be equal to the pressure in external region 46 less the pre-compression load in bellows 30. The water exits region 45 through outlet 58 at controlled pressure that is fed to a spray nozzle (not shown).

If the control air pressure at air inlet 10 is less than a kickoff pressure, determined by the amount of pre-compression of the bellows structure 30, the valve plug 54 remains seated in water inlet 16 and no water passes through the actuator. The spray nozzle receives no water.

When the pneumatic control pressure exceeds the kickoff pressure of the actuator, bellows structure 30, piston 32 and valve plug 54 are moved downwardly so that water flows through the inlet 16 into internal region 45 of the actuator and out to the spray nozzle via outlet 58. The spray nozzle permits flow, but also offers resistance to the water flow. Thus the pressure in internal region 45 builds. As the pressure in internal region 45 increases, the sum of the opposing forces increases until the sum of forces matches the force exerted by the control air pressure in external region 46. A balance point results in which the valve member 50 and inlet 16 maintain their relative positions and allow exactly the required water flow rate to match the spray nozzle flow rate at the spray water pressure. If the valve member 50 moves to reduce the water flow through inlet 16, then the pressure in internal region 45 drops as more water exits the spray nozzle than enters through the inlet, and an imbalance of forces pushes the valve member to open the inlet again. Similarly, if the valve member moves to increase the water flow through inlet 16, then the pressure in the internal region 45 increases as less water exits to the spray nozzle than enters through the inlet and an imbalance of forces pushes the valve member to close the inlet again.

The pneumatic control pressure is controlled over a range of pressures independent of the actuator. Excessive pneumatic control pressure supplied will operate the actuator in the same manner as described above until the pressure of the source water is exceeded. At that point, the inlet 16 will effectively remain open. The actuator and components however, are designed to accept reasonably excessive pressures without damage.

The novel actuator of the present invention provides a continuous proportional response to input control but with almost no hysteresis. Moreover, it allows a remote generation of the pneumatic control signal that acts as the reference pressure for control of the actuator. Using a pneumatic signal offers reliability when placing the actuator in a harsh environment. The very short stroke required for the piston and bellows structure allows the actuator to be reduced in size and weight. The simplicity of design removes the need for return springs, stroke adjusting washers, dynamic seals, etc.

The first embodiment can also be formed using a flexible seal and spring in place of the metal bellows structure described. It will be apparent to those skilled in the art that other arrangements involving a seal and a biasing structure are possible. The principles of operation are the same in such alternative embodiments.

Figure 2:
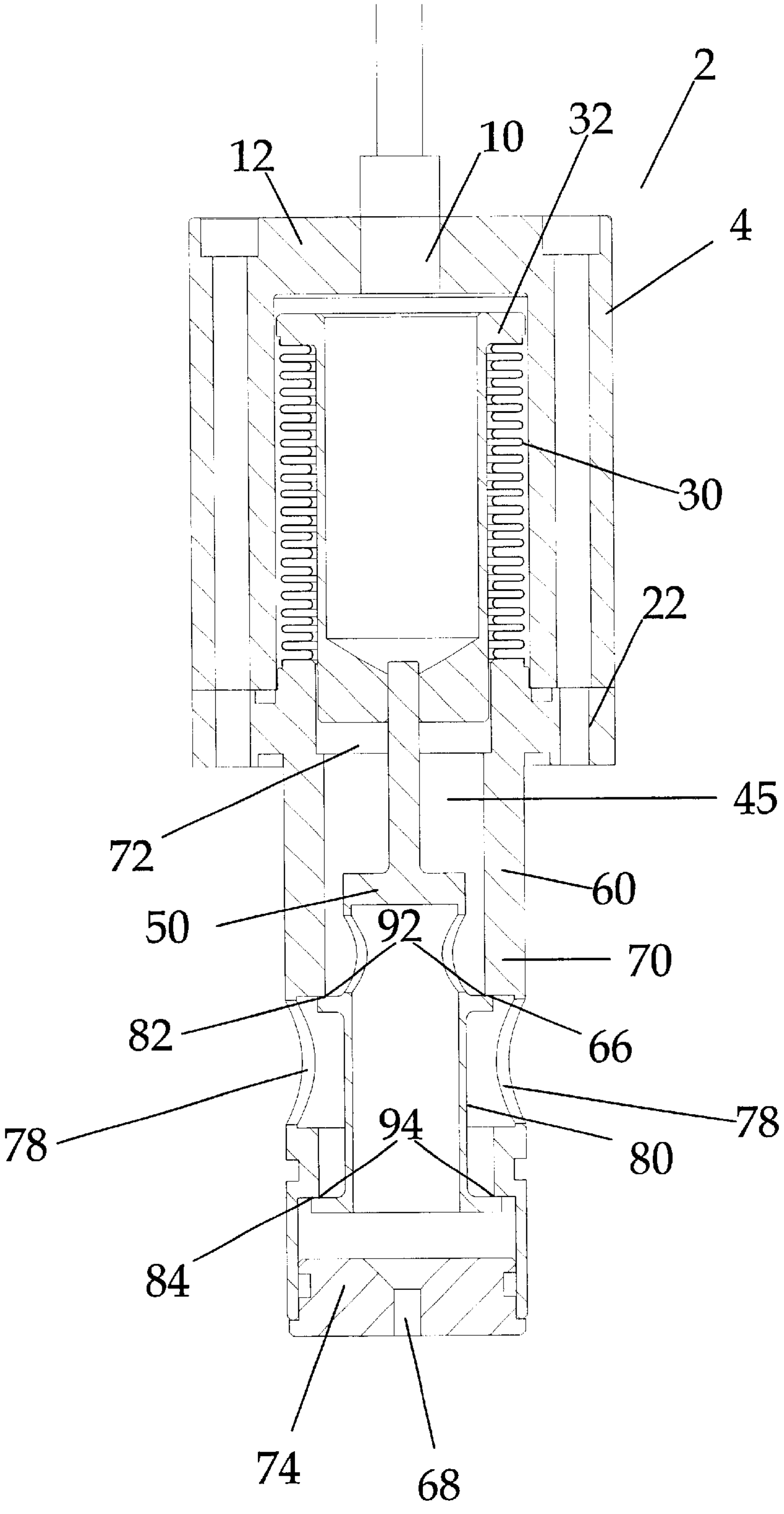
FIG. 2 is a section view through a second embodiment of the actuator of the present invention which includes two enlarged inlet valve orifices to make the actuator suitable for use in a steam shower.

FIG. 2 illustrates a second embodiment of the actuator of the present invention intended for steam flow control. Such an actuator requires a larger inlet opening to allow for sufficient steam flow. The steam inlet is equivalent to water inlet 16 in the first embodiment of FIG. 1. As the fluid inlet area of the actuator is increased, the valve member increases in size and the back pressure at the bellows structure 30 increases. To negate this effect, the second embodiment of the actuator relies on a dual inlet and valve arrangement in which the back pressure on the bellows structure is due to the difference in area between the two inlets.

The basic structure of the actuator of the second embodiment is similar to that of the first embodiment. The actuator also behaves in a similar fashion as the first embodiment but allows for higher fluid flow rates to be pressure controlled. In FIG. 2, those parts of the actuator that are identical with the first embodiment are labeled with the same reference number.

The actuator of the second embodiment differs from the first embodiment primarily in that two orifice openings 66 are used in place of the single orifice 16. In the second embodiment, base 22 is formed with a hollow tubular extension 60 from the base 22 of housing 4 for insertion into a steam supply passage from a steam source (not shown). The extension 60 includes a pair of inlet openings 66 for allowing steam into the internal region 45 of the bellows structure 30 and an outlet 68 for delivering steam to the outlet of a steam shower (not shown). Outlet 68 acts as a flow orifice to predictably translate the steam pressure in region 45 to steam flow to the steam shower. In this embodiment the path from outlet 68 to atmosphere has a negligible pressure drop. Tubular extension 60 is defined by side walls 70 extending downwardly from base 22. There is an open upper end 72 so that the interior of the extension freely communicates with the internal region 45 of bellows structure 30. The lower end 74 of the extension is closed and formed with an outlet 68. A pair of aligned openings 78 extend through side walls 70 to define passages to the interior of the extension.

The actuator of the second embodiment includes a piston 32 that is sealably mounted to bellows structure 30 as in the first embodiment. In addition, there is a valve member 50 mounted to the piston for movement with the piston and the bellows structure. In the second embodiment, the valve member 50 comprises a stem 52 that is mounted to piston 32 and a lower piston 80 movable within the interior of extension 60. Piston 80 is formed with a pair of upper and lower flanges 82 and 84, respectively, adapted to seal against shoulders 92 and 94, respectively, formed on the interior side walls of extension 60 to define the inlets 66 that admit steam into the interior of extension 60 and the internal region 45 of bellows structure 30.

In the embodiment illustrated in FIG. 2, the combined area of the inlet opening 66 associated with upper flange 82 and seat 92 is smaller than the combined area of the inlet opening associated with lower flange 84 and seat 94. This is accomplished by using thinner extension side walls in the vicinity of seat 94. The source steam pressure at opening 78 is applied against upper flange 82 and in the opposite direction against lower flange 84. The result is that the net back pressure on the bellows structure due to source steam pressure on the flanges is equal to the difference in area between the pair of openings. The forces on this embodiment of the actuator differ from the first embodiment in that the additional force is equal to the difference between the fluid source pressure and the internal chamber pressure acting on the area difference of the upper and lower inlet openings. By making this area difference small as compared to the area of the bellows structure 30, this additional force can be made negligible. However, the pair of larger inlets allow a greater steam flow to pass through. While the illustrated embodiment shows a pair of inlet openings 66, it will be readily apparent to those skilled in the art that a plurality of paired openings are possible as long as the difference in area of each pair of openings is relatively small.

Figure 3:
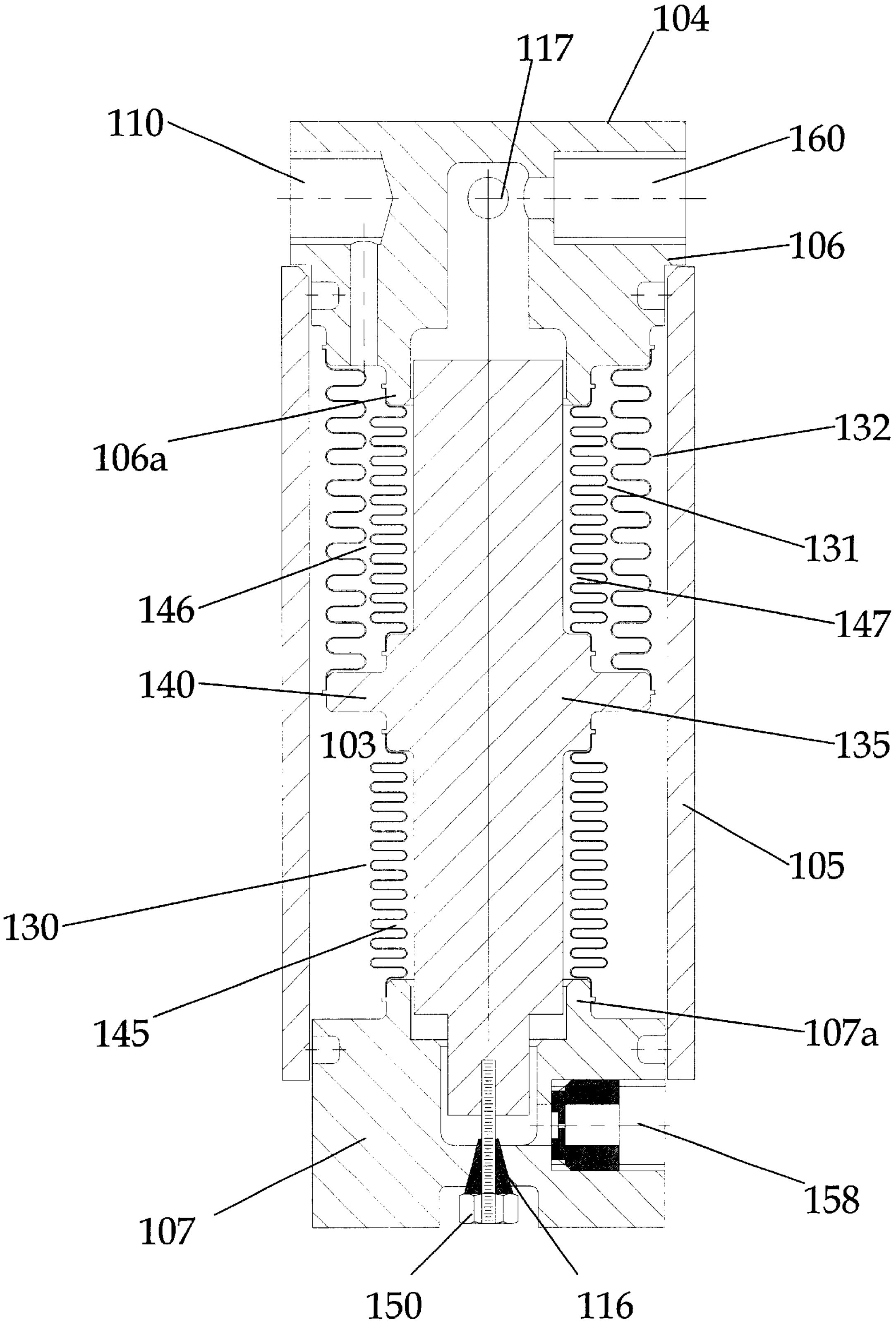
FIG. 3 is a section view through a third embodiment of the actuator of the present invention which includes multiple bellows structures for use with an internally mixed atomizing spray nozzle.
Figure 3A:
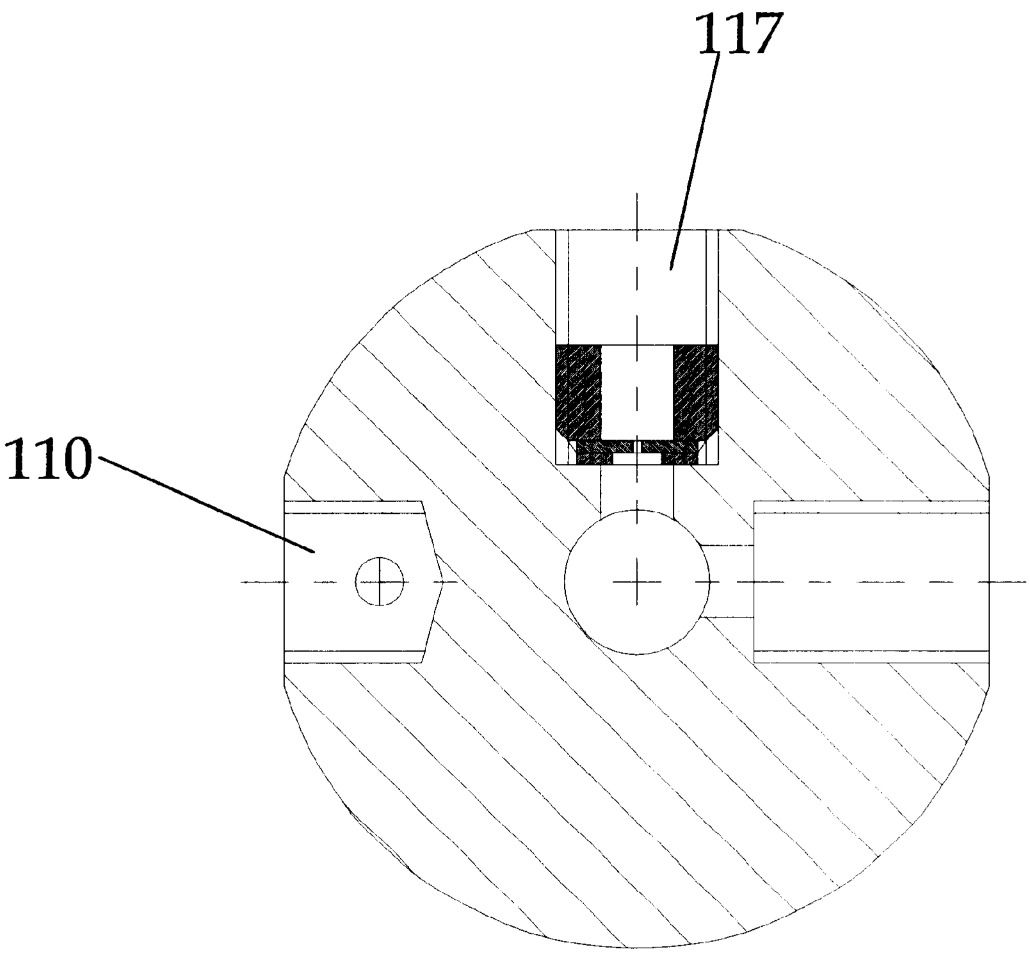
FIG. 3*a* is a section view taken through the top of the actuator to show the atomizing air inlet in detail as well as the pneumatic control air inlet.

FIGS. 3 and **3*a* illustrate a third embodiment of the present invention intended for use with an internally mixed atomizing spray nozzle that requires an additional flow of atomizing air. The actuator of FIGS. 3 and 3*a*** acts to control two separate flows, one of water and the other of atomizing air, with a predictable flow rate and in a predictable ratio using a single pneumatic control signal.

The actuator of the third embodiment uses three bellows to control the water flow in a similar pressure regulating manner as the first two embodiments described above except that the pressure is regulated relative to a third pressure. Whereas in the first two embodiments, pressure in chamber 45 is controlled to a pressure related to the pneumatic control pressure in chamber 46 as referenced to atmosphere, in the third embodiment the pressure in chamber 145 is controlled to a pressure related to the pneumatic control pressure in chamber 146 as referenced to the pressure in chamber 147.

Referring to FIG. 3, there is shown an actuator housing 104 according to the third embodiment having a first inlet 116 at the base of the actuator connectable to a source of spray water (not shown). A second inlet 110 is connectable to a pressure source (not shown). In addition, there is a third inlet 117 connectable to a source of air under pressure for atomizing the water admitted through inlet 116. FIG. **3*a* is a cross-section view through the top of the actuator of FIG. 3 showing inlet 117**.

Preferably, the actuator is formed from a generally cylindrical body 105 in which end caps 106 and 107 are inserted to define an enclosed interior 103. There is a piston 135 movable within interior 103. End caps 106 and 107 include inwardly extending annular walls 106*a* and 107*a* that slidably receive the ends of piston 135 to guide the movement of the piston. Piston 135 also includes an annular flange 140 intermediate its ends. Flange 140 serves as the mounting surface on the piston for the ends of the multiple bellows structures located in the interior of the actuator.

A first resilient spray water bellows structure 130 extends between annular wall 107*a* at the lower end of the actuator and flange 140 of the piston to define an internal region 145 of the first bellows structure in sealed communication with the first inlet 116 to receive water under pressure. A second resilient pneumatic bellows structure 132 extends between the upper end of the housing and flange 140. Bellows structure 132 extends adjacent to and encloses a third resilient bellows structure 131 to define an internal region 146 in sealed communication with second inlet 110 connected to the pressure source. The third resilient atomizing air bellows structure 131 extends between annular wall 106*a* at the upper end of the actuator and flange 140 of the piston opposite to bellows structure 130. The internal region 147 of the third bellows structure 131 is in sealed communication with the third inlet 117 which receives atomizing air.

The first, second and third bellows structures expand or contract within interior 103 of housing 104 in response to pressures within the internal regions of the bellows structures to exert forces on the piston to move the piston to a position such that the forces exerted by the first bellows structure equal the forces exerted by the second and third bellows structures. This will be explained in more detail below.

A valve member 150 extends from the lower end of piston 135 and moves with the piston to open and close first inlet 116 to vary the flow of water into internal region 145 from the water source. A water outlet 158 from the actuator housing communicates with internal region 145 to permit the exit of the water from region 145 to the spray nozzle (not shown). Atomizing air outlet 160 and spray water outlet 158 are both connected to a spray nozzle (not shown) which will pre-mix the two fluids before releasing them as a spray. The spray nozzle has a set of characteristics with respect to flow and back pressure. The pressure at outlet 160 and the pressure at outlet 158 are maintained at the same value by the spray nozzle. The pressure in region 147 is connected to the spray nozzle through outlet 160 and is maintained at the same pressure as the spray nozzle. Inlet 117 introduces atomizing air from a pressure source (not shown) that causes a predictable flow rate based on the back pressure of the spray nozzle.

Varying the pressure from the pressure source at second inlet 110 provides a signal to move the position of the piston to control the flow of water from the outlet 158 at a predictable water flow rate. The flow of atomizing air at inlet 117 responds based on the back pressure characteristics of the spray nozzle such that the water and the atomizing air are in the correct ratio to maintain the optimum water droplet size over a range of water flows.

In operation, the actuator of the third embodiment, atomizing air is fed into bellows structure 131 via inlet 117 which pressurizes the bellows structure and extends it against bellows structure 130. Bellows structure 130 receives spray water from the water source via inlet 116 which pressurizes the bellows structure to counter the atomizing air pressure. Ideally, equal size bellows 130 and 131 are used such that a force balance is maintained when the pressures are equal, although different areas for these two opposing bellows can be used to allow a ratio of pressures to be produced.

Larger diameter pneumatic bellows structure 132 extends outside the atomizing air bellows structure 131 to form region 146 bounded by the bellows structure 132 on its outer side, atomizing air bellows structure 131 on its inner side, flange 140 on its lower side and housing 104 on its upper side. Region 146 receives the pneumatic control signal from inlet 110 which tends to expand the bellows structure 131 against flange 140 of piston 135. Thus, at flange 140, the piston is subjected to the following forces:

$$Pa*Aa+Pc*(Ac-Aa)+L=Pw*Aw$$

Where:

Pw==pressure of spray water in region 145

Aw==effective area of the spray water bellows structure 130

Pa==pressure of atomizing air in region 147

Aa==effective area of the atomizing air bellows structure 131

Pc==pressure of pneumatic signal in region 146

Ac==effective area of the pneumatic bellows structure 132

L==pre-set spring load of bellows 130, 131, 132

The internally mixed atomizing air spray nozzle (not shown) being controlled by the actuator of the present invention has a set of flow characteristics that determine the back pressure produced under certain flow conditions. The important characteristics for this application is the variation of required pressure and air flow to maintain a constant spray particle size as the flow of water is increased. With only atomizing air flowing and no water flowing the required pressure to the nozzle is minimum. As the flow of spray water is increased to the nozzle, the flow of atomizing air must be reduced and the pressure to the nozzle must be increased.

In the third embodiment, the control of atomizing air flow and pressure to the nozzle is effected passively. Atomizing air enters inlet 117 from a source pressure (not shown) that is held at a particular constant value. The atomizing air passes through inlet 117 from the source pressure to the spray nozzle pressure. The flow of atomizing air is determined by this pressure drop and thus by the spray nozzle pressure. As water is introduced to the spray nozzle, the mixed flow through the nozzle increases the back pressure of the nozzle. This increase in back pressure causes a reduction in pressure drop through inlet 117 which causes a reduction in atomizing air flow. Thus the ratio of atomizing air and spray water adjusts and maintains the optimum spray particle size according to the nozzle characteristics.

For example, the atomizing air and water bellows structures 131 and 130, respectively, can be designed to be of equal area, and the area of the pneumatic bellows structure 132 can be dimensioned to be twice the area of the atomizing air bellows 131. Therefore, if the pneumatic signal from inlet 110 is used as the control input with water pressure as the output response, then in the above described setup, it is readily apparent that the water pressure will always be greater than the air pressure by an amount equal to the control pressure less any pre-set spring loads on the bellows. Thus the water flow rate through outlet 158 of the actuator to the atomizing air chamber of the not shown spray nozzle is directly related to the pneumatic pressure.

There is a piston 135 movable within the interior 103 of housing 104. The initial setup involves pre-compressing the bellows unit a predetermined amount and attaching the valve stem such that, at this pre-compressed setting and with no pressure (or equal pressure) in regions 145 or 146 or 147, the valve orifice 116 is closed. This establishes a "kick-off" pressure for the control signal such that no actuator movement occurs until this initial pressure is reached. Such a "kick-off" pressure is equal to the force developed in the bellows structures during pre-compression divided by the acting area of the pneumatic pressure region 147.

The actuator is arranged as part of an actuator/nozzle system consisting of an atomizing air source (not shown) that communicates with inlet orifice 110, a spray water source (not shown) that communicates with inlet orifice 116, a spray water outlet orifice 158 and a spray nozzle (not shown). Atomizing air passes from the atomizing air source through fixed orifice 117 that reduces the air pressure to the desired air feed pressure for the spray nozzle. The air at this new pressure feeds the spray nozzle and also is contained by a chamber formed by the atomizing air bellows 131. As the spray water feed to the spray nozzle changes, the flow demand for atomizing air changes and thus the pressure drop through the atomizing air source orifice 117 changes. This allows the air flow to vary from a low pressure, high flow feed into the spray nozzle when the water flow is at a minimum to a high pressure, low flow feed when the water flow is at a maximum. By way of example, the atomizing air feeding the spray nozzle can vary from 0.6 scfpm at 22 psig at no water flow to 0.4 scfpm at 45 psig at a water flow of 3 usgph.

The spray water passes from the water source through inlet orifice 116 directly into the spray water bellows 130. This orifice opening is controlled by the actuator such that it opens whenever the atomizing air pressure plus the pneumatic control pressure is greater than the existing water pressure in the bellows plus the actuator pre-compression. The outlet of the water into the spray nozzle is through outlet orifice 158 which serves to determine the water flow rate. The pressure drop across outlet 158 is always equal to the control pressure less that actuator pre-compression effecting a predictable flow rate.

Within the spray nozzle the relative flows of air and water are combined to produce the desired spray pattern and particle size.

In all the embodiments of the actuator of the present invention, the outlet pressure of the fluid flow passing through actuator is determined by controlling the pneumatic pressure signal. The source pressure of the fluid flow must be greater than the desired maximum outlet pressure of the fluid flow, but is otherwise independent of the other pressures within the actuator system. The source pressure of the fluid may even fluctuate somewhat and the actuator of the invention will respond with a non-fluctuating output pressure. The fluid inlet opening of the actuator is varied by movement of the valve member to allow sufficient flow to maintain the output pressure. The pressure drop through the inlet varies in response to the flow. Although the source pressure of the fluid can vary, it should be noted that the pressure difference between the source and outlet pressure of the fluid flow can easily, in the case of steam, be sufficient to create sonic flow through the inlet opening. Such sonic flows can produce erosion and wear in the sealing surfaces of the valve member and the inlet.

To minimize such damage, the valve sealing surface and the seat of the fluid inlet are preferably made resistant to erosion by selecting appropriate materials and/or surface hardening. As an alternative, the fluid source pressure can be limited such that the maximum pressure drop does not create excessive velocities through the regulating inlet 16 to the actuator region 45.

Where the fluid source pressure cannot be limited, a preferred approach is to create an additional pressure drop prior to the inlet or orifice 16 such that the pressure drop across the inlet orifice 16 is limited. Such an additional pressure drop can be created by forming a passage of reduced diameter through which the fluid flow must pass. One or more such pressure drops would reduce the pressure feeding the inlet orifice 16 thereby reducing the pressure drop through the orifice during operation. The result is a reduction in the velocity of the fluid passing through the inlet orifice 16 which reduces wear of the sealing surfaces.

Figure 4:
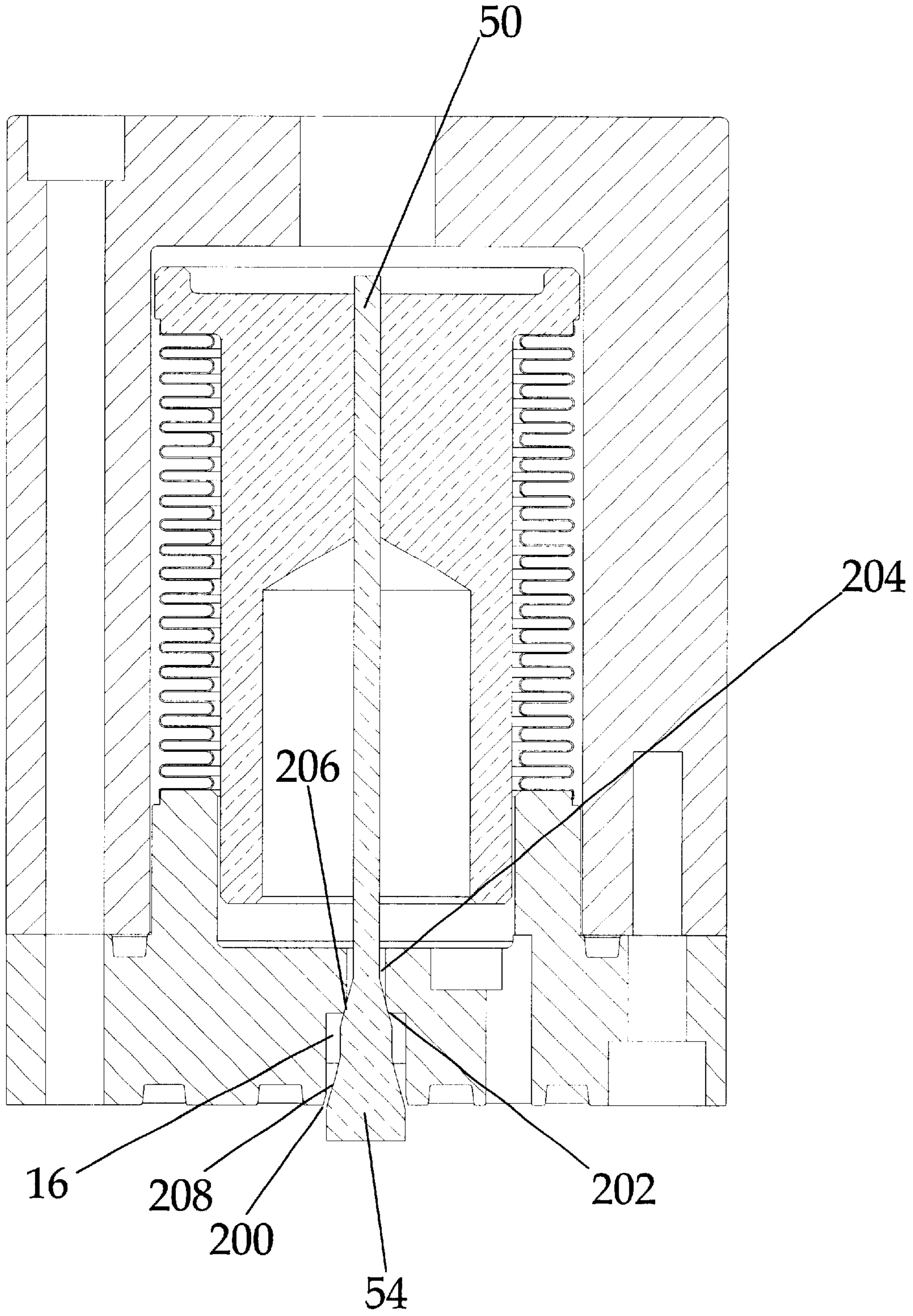
FIG. 4 is a section view through a fourth embodiment of the actuator of the present invention that includes a series of passages in the fluid inlet path to reduce the pressure drop across the valve orifice.

FIG. 4 illustrates an actuator that incorporates a pressure drop passage prior to the inlet orifice as mentioned above. The actuator is essentially the same as the actuator of the first embodiment of FIG. 1 except that base 22 is formed with an inlet 16 having a prior passage 200 that limits the flow area prior to inlet 16. Valve member 50 includes a valve plug 54 that has multiple conical surfaces 206 and 208. When valve member 50 is closed, surface 206 seals opening 204 and surface 208 approaches, but does not completely close, opening 200. Passage 200 creates a pressure drop in the source water at inlet 16. The size of prior passage 200 can be varied in conjunction with opening 204 since the valve seating surfaces move simultaneously by virtue of being connected to common valve member 50. In this manner, pressure drops through prior passage 200 are held substantially constant over varying water flows. Enlargement of prior passage 200 due to movement of the valve member results in increased flow volume at substantially constant velocity so that resulting pressure drop remains substantially constant over a wide flow range. The prior passages would not need to close completely over the range of operation and, in fact, it is usually better that they do not close completely. While FIG. 4 shows a single prior passage 200, multiple, spaced passages are possible.

Figure 5:
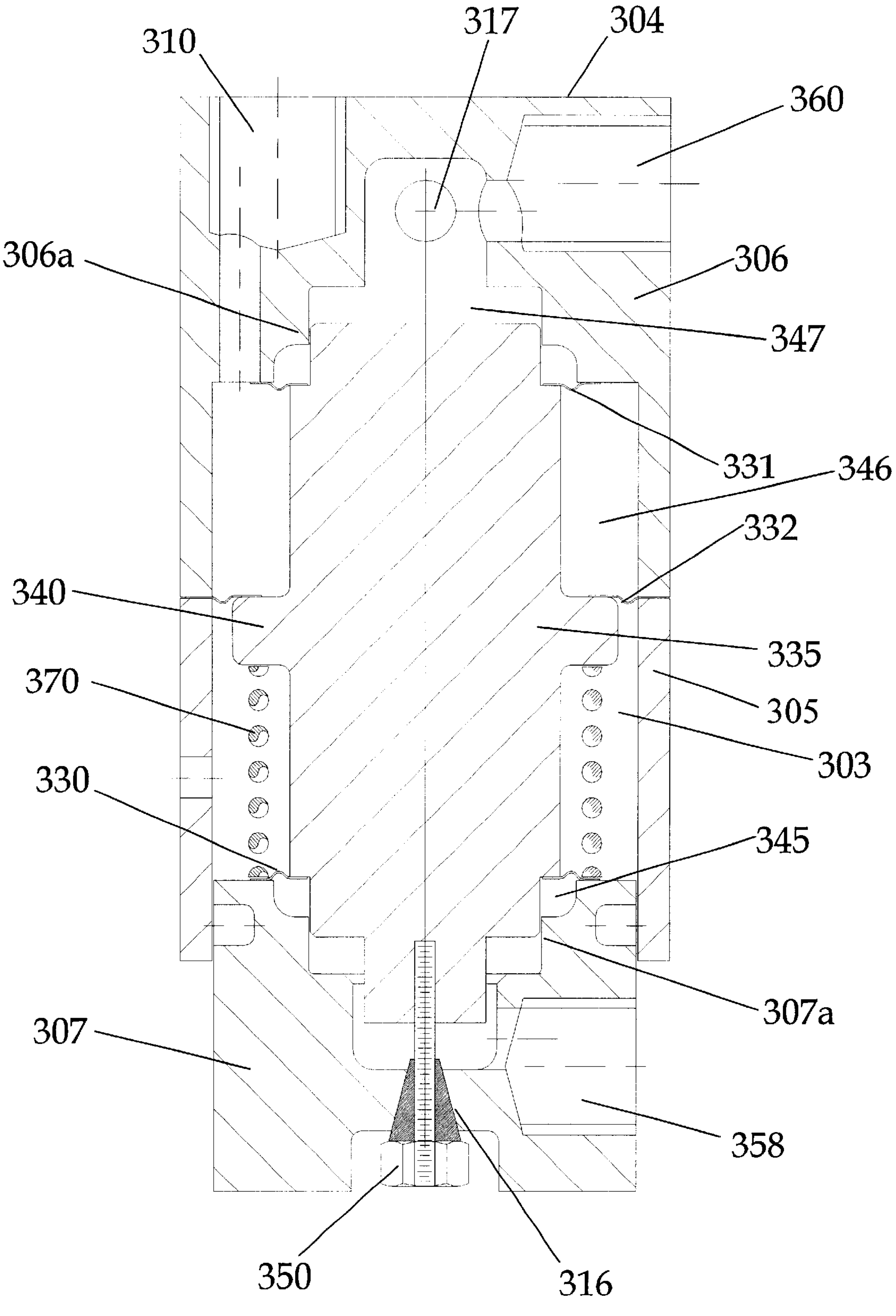
FIG. 5 is a section view through a fifth embodiment of the actuator of the present invention which employs a resilient seal and a biasing member to replace the metal bellows structure of the previously described embodiments.

FIG. 5 illustrates, by way of example, a fifth embodiment which is an alternative arrangement of the third embodiment shown in FIG. 3. In FIG. 5, features equivalent to those of the third embodiment are labeled with same reference number increased by 200, e.g. a feature identified by reference number 106 in FIG. 3 will be identified by reference number 306 in FIG. 5. The embodiment of FIG. 5 uses flexible seals and a spring to replace the metal bellows structure of the actuator of FIG. 3. The actuator of the fifth embodiment uses flexible seal 330 in place of metal bellows 130 to form chamber 345 of similar function to chamber 145. Flexible seal 331 replaces metal bellows 131 to form chamber 347 of similar function to chamber 147; opposing chamber 345. Flexible seal 332 replaces metal bellows 132 to form chamber 346 of similar function to chamber 146. The initial set-up involves pre-compressing spring 370 rather than bellows 130, 131, 132 to create an equivalent kick-off pressure for valve stem 350. Thus the concept of the third embodiment which uses metal bellows is reproduced in the fifth embodiment which uses flexible seals and a spring. As in previous embodiments, piston 335 moves within the interior of the actuator in response to pressure differences in the three regions to simultaneously control two separate flows, one of water at inlet 316 and the other of air at outlet 360, in a predictable ratio using a single pneumatic control signal at inlet 310. At different water flow rates, the pressure and flow rate of atomizing air through outlet 360 automatically adjusts to maintain a substantially constant spray particle size for the fluid.

It will be clear to a person skilled in the art that the actuator or the present invention is useful in many other applications where the need exists for a rugged and reliable method to control the pressure or flow of a fluid at a remote location in a harsh environment. The approach taken here is one of using a controlled air pressure generated at one location (off machine) to operate an actuator at another location (on machine). The actuator of the present invention uses the pressure balance principle in a variety of configurations to meet a number of different flow requirements for a number of different fluids. In addition, this approach provides a small, light and simplified actuator design. The apparatus of the present invention is not limited to using a metal bellows structure. As clearly shown in the embodiment of FIG. 5, it is possible to substitute an elastomeric seal in place of the metal bellows and to substitute a separate spring for the spring action of the metal bellows. A variety of other arrangements of components can be devised which would operate on the same principles disclosed above for the same actuator effect.

Although the present invention has been described in some detail by way of example for purposes of clarity and understanding, it will be apparent that certain changes and modification may be practised within the scope of the appended claims.

We claim:

1. An actuator for controlling the flow of fluid from a fluid source comprising:

a housing having a first inlet connectable to the fluid source and a second inlet connectable to a pressure source;

a piston movable within the housing;

a flexible seal extending between the piston and the housing to define a first region in sealed communication with the first inlet and a second region in sealed communication with the second inlet, the piston moving within the housing in response to the difference in pressures between first and second regions;

a valve member adapted to move with the piston to open and close the first inlet to vary the pressure in the first region; and at least one orifice in sealed communication with the first region to permit the exit of the flow of fluid and provide resistance to the fluid flow so that the pressure in the first region builds to match proportionally the pressure at the second inlet, the pressure from the pressure source at the second inlet providing a signal to control the pressure in the first region feeding the at least one orifice to determine the flow passing the at least one orifice without regard to the exact position of the valve member.

2. An actuator as claimed in claim 1 in which the flexible seal is a resilient bellows structure.

3. An actuator as claimed in claim 1 including at least one resilient member extending between the piston and the housing to bias the piston to a default closed position of the first inlet.

4. An actuator as claimed in claim 3 in which the resilient member is a spring.

5. An actuator as claimed in claim 3 in which the resilient member and the seal are combined in a resilient bellows structure.

6. An actuator as claimed in claim 1 wherein the actuator comprises another flexible seal to define the second region and a further flexible seal extending between the housing and the piston to define a third region in sealed communication with a third inlet in the housing, the third inlet connectable to a second pressure source, the piston moving within the housing in response to pressure differences within the first, second and third regions to a position such that the forces exerted by the first region on the piston are balanced by the forces exerted by the second and third regions.

7. An actuator as claimed in claim 6 in which the third inlet is connectable to a pressure source that provides a source of pressure for atomizing the fluid into spray particles, the third region co-operating with the first and second regions to vary the atomizing pressure according to the flow of fluid from the first inlet to maintain a substantially constant fluid particle size over a range of fluid flows.

8. An actuator as claimed in claim 6 including at least one resilient member extending between the piston and the housing to bias the piston to a default closed position of the first inlet.

9. An actuator as claimed in claim 8 in which the at least one resilient member is a spring.

10. An actuator as claimed in claim 8 in which the at least one resilient member and the flexible seals are combined in resilient bellows structures.

11. An actuator as claimed in claim 8 in which the second and third regions share the further flexible seal, the second region extending between the another flexible seal and the further flexible seal.

12. An actuator as claimed in claim 11 in which the sealed regions are arranged such that, in equilibrium, the forces exerted by pressures in the regions on the piston are balanced according to the formula:

$$P_3*A_3+P_2*(A_2-A_3)+L=P_1*A_1$$

where:

$P_1$=pressure within the first region $A_1$=internal area of the first region $P_2$=pressure within the second region $A_2$=internal area of the second region $P_3$=pressure within the third region $A_3$=internal area of the third region L=combined pre-set spring loading of the resilient members.

13. An actuator for controlling the flow of fluid from a fluid source comprising:

a housing having a first inlet connectable to the fluid source and a second inlet connectable to a pressure source;

a resilient bellows structure extending between the first and second inlets within the housing to define an internal region of the bellows structure in sealed communication with one of the first and second inlets and an external region of the bellows structure in sealed communication with the other of the first and second inlets, the bellows structure expanding or contracting within the housing depending on the difference in pressures between the internal and external regions of the bellows;

a valve member adapted to move with the bellows structure to open and close the first inlet to vary the pressure in that one of the regions that is in communication with the first inlet; and at least one orifice in sealed communication with the first inlet to permit the exit of the flow of fluid and provide resistance to the fluid flow so that the pressure in that one of the regions that is in communication with the first inlet builds to match proportionally the pressure at the second inlet, the pressure from the pressure source at the second inlet providing a signal to control the pressure in the first inlet feeding the at least one orifice to determine the flow passing the at least one orifice without regard to the exact position of the valve member.

14. An actuator as claimed in claim 13 including a piston within the housing movable with the expansion and contraction of the bellows structure, the housing and the piston co-operating to define an annular region therebetween to receive the bellows structure to prevent buckling of the bellows structure.

15. An actuator as claimed in claim 14 in which the bellows structure has first and second ends, the first end being sealably attached to the piston and the second end being sealably attached to the housing such that the internal region of the bellows structure between the piston and the bellows structure is in communication with the first inlet and the external region of the bellows structure between the bellows structure and the housing is in communication with the second inlet.

16. An actuator as claimed in claim 14 in which the valve member extends from the piston to be seatable in the first inlet to open and close the first inlet.

17. An actuator as claimed in claim 16 in which the valve member comprises a stem extending from the piston with a sealing plug at the free end of the stem to be received in the first inlet, the plug and stem being mounted for movement to permit adjustment of the position of the plug.

18. An actuator as claimed in claim 16 in which the piston is formed with a flange to which the first end of the bellows structure is sealably attached.

19. An actuator as claimed in claim 18 in which the valve member extends from the piston a distance such that when the valve member is positioned to close the first inlet, the bellows structure is compressed between the piston flange and the housing.

20. An actuator as claimed in claim 13 in which the first inlet is defined by a pair of differently sized orifices and the valve member acts to simultaneously seal or open the pair of orifices.

21. An actuator as claimed in claim 13 in which the pressure source is a pneumatic pressure source.

22. An actuator as claimed in claim 13 in which the fluid source is a water source and the at least one orifice of the actuator communicates with a spray nozzle.

23. An actuator as claimed in claim 13 in which the fluid source is a steam source.

24. An actuator as claimed in claim 23 including an extension from the housing for insertion into a steam supply passage from the steam source, the extension including the first inlet and an outlet.

25. An actuator as claimed in claim 24 in which the extension is a hollow tubular member with side walls having a first end in communication with the internal region of the bellows structure and a second end formed with the outlet, the first inlet being defined by a pair of orifices each of a different size for admitting steam into the internal region of the bellows structure.

26. An actuator as claimed in claim 25 in which the valve member comprises a piston movable within the extension member, the piston having a pair of spaced flanges, each flange being adapted to control the opening of one of the pair of differently sized orifices such that the force of the steam exerted on the valve member is equal to the force of the steam pressure applied to the difference in area between the pair of orifices.

27. An actuator for controlling the pressure of fluid from a fluid source comprising:

- a housing having a first inlet connectable to the fluid source, a second inlet connectable to a pressure source, and a third inlet connectable to a second pressure source;
- a piston movable within the housing;
- a first resilient bellows structure extending between the housing and the piston to define an internal region of the first bellows structure in sealed communication with the first inlet;
- a second resilient bellows structure extending between the housing and the piston opposite the first bellows structure to define an internal region of the second bellows structure in sealed communication with the second inlet;
- a third resilient bellows structure extending between the housing and the piston adjacent to and internal to the second bellows structure to define an internal region of the third bellows structure in sealed communication with the third inlet;
- the first, second and third bellows structures expanding or contracting within the housing in response to pressures within the internal regions of the bellows structures to exert forces on the piston to move the piston to a position such that the forces exerted by the first bellows structure equals the forces exerted by the second and third bellows structures;
- a valve member adapted to move with the piston to open and close the first inlet to vary the flow of fluid from the fluid source; and
- an outlet from the housing in communication with the first inlet to permit the exit of the flow of fluid whereby varying the pressure from the pressure source at the second inlet provides a signal to move the position of the piston to control the pressure of fluid from the outlet relative to the pressure in the second bellows structure.

28. An actuator as claimed in claim 27 in which the first and third bellows structures are the same size.

29. An actuator as claimed in claim 27 in which the bellows structures are arranged such that, in equilibrium, the forces exerted by the bellows structures on the piston are balanced according to the formula:

$$P_3*A_3+P_2*(A_2-A_3)+L=P_1*A_1$$

where:

$P_1$=pressure within the first bellows structure $A_1$=internal area of the first bellows structure $P_2$=pressure within the second bellows structure $A_2$=internal area of the second bellows structure $P_3$=pressure within the third bellows structure $A_3$=internal area of the third bellows structure L=combined pre-set spring loading of the bellows structures.

30. An actuator as claimed in claim 27 in which the third inlet is connectable to a pressure source that provides atomizing pressure for atomizing the fluid in fluid particles, the third bellows structure co-operating with the first and second bellows structures to vary the atomizing pressure according to the flow of fluid from the first inlet to maintain a substantially constant fluid particle size over a range of fluid flows.

31. An actuator for controlling the flow of fluid from a fluid source comprising:

- a housing having a first inlet connectable to the fluid source, a second inlet connectable to a first pressure source, and a third inlet connectable to a second pressure source;

a piston movable within the housing;

a first flexible seal extending between the housing and the piston to define a first region in sealed communication with the first inlet;

a second flexible seal extending between the housing and the piston to define a second region in sealed communication with the second inlet;

a third flexible seal extending between the housing and the piston to define a third region in sealed communication with the third inlet;

the piston moving within the housing in response to pressure differences within the first, second and third regions to a position such that the forces exerted by the first region on the piston are balanced by the forces exerted by the second and third regions;

a valve member adapted to move with the piston to open and close the first inlet to vary the flow of fluid from the fluid source; and an outlet from the housing in communication with the first inlet to permit the exit of the flow of fluid whereby varying the pressure from the pressure source at the second inlet provides a signal to move the position of the piston to control the pressure of fluid from the outlet.

32. An actuator as claimed in claim 31 in which the first and third regions have substantially the same area.

33. An actuator as claimed in claim 31 including at least one resilient member extending between the piston and the housing to bias the piston to a default closed position of the first inlet.

34. An actuator as claimed in claim 32 in which the at least one resilient member is a spring.

35. An actuator as claimed in claim 32 in which the at least one resilient member and the flexible seals are combined in resilient bellows structures.

36. An actuator as claimed in claim 32 in which the second and third regions share the third flexible seal, the second region extending between the second flexible seal and the third flexible seal.

37. An actuator as claimed in claim 36 in which the sealed regions are arranged such that, in equilibrium, the forces exerted by pressures in the regions on the piston are balanced according to the formula:

$$P_3*A_3+P_2*(A_2-A_3)+L=P_1*A_1$$

where:

$P_1$=pressure within the first region $A_1$=internal area of the first region $P_2$=pressure within the second region $A_2$=internal area of the second region $P_3$=pressure within the third region $A_3$=internal area of the third region L=combined pre-set spring loading of the resilient member.

38. An actuator as claimed in claim 37 in which the third inlet is connectable to a pressure source that provides a source of pressure for atomizing the fluid into spray particles, the third region co-operating with the first and second regions to vary the atomizing pressure according to the flow of fluid from the first inlet to maintain a substantially constant fluid particle size over a range of fluid flows.

* * * * *